(12) United States Patent
Ros et al.

(10) Patent No.: US 12,287,299 B2
(45) Date of Patent: Apr. 29, 2025

(54) SINGLE PIECE DROPLET GENERATION AND INJECTION DEVICE FOR SERIAL CRYSTALLOGRAPHY

(71) Applicants: Alexandra Ros, Phoenix, AZ (US); Daihyun Kim, Mesa, AZ (US); Diandra Doppler, Scottsdale, AZ (US); Jorvani Cruz Villarreal, Tempe, AZ (US); Richard Kirian, Tempe, AZ (US); Reza Nazari, Tempe, AZ (US); Sahir Gandhi, Tempe, AZ (US)

(72) Inventors: Alexandra Ros, Phoenix, AZ (US); Daihyun Kim, Mesa, AZ (US); Diandra Doppler, Scottsdale, AZ (US); Jorvani Cruz Villarreal, Tempe, AZ (US); Richard Kirian, Tempe, AZ (US); Reza Nazari, Tempe, AZ (US); Sahir Gandhi, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 18/295,761

(22) Filed: Apr. 4, 2023

(65) Prior Publication Data

US 2023/0243765 A1 Aug. 3, 2023

Related U.S. Application Data

(63) Continuation of application No. 15/930,313, filed on May 12, 2020, now Pat. No. 11,624,718.
(Continued)

(51) Int. Cl.
*G01N 23/20* (2018.01)
*B01L 3/00* (2006.01)
(Continued)

(52) U.S. Cl.
CPC ...... *G01N 23/20025* (2013.01); *B01L 3/0241* (2013.01); *B01L 3/502715* (2013.01);
(Continued)

(58) Field of Classification Search
CPC .......... G01N 23/20025; G01N 23/201; G01N 35/1016; G01N 2035/1034;
(Continued)

(56) References Cited

U.S. PATENT DOCUMENTS

| 8,272,576 B2 * | 9/2012 | Doak | B05B 7/0475 239/128 |
| 9,643,136 B2 * | 5/2017 | Hansen | F16K 99/0015 |

(Continued)

FOREIGN PATENT DOCUMENTS

WO 2010052578 A1 5/2010

OTHER PUBLICATIONS

Asher, G., et al. "The crystal structure of NAD (P) H quinone oxidoreductase 1 in complex with its potent inhibitor dicoumarol." Biochemistry 45.20 (2006): 6372-6378.
(Continued)

*Primary Examiner* — Christine T Mui
(74) *Attorney, Agent, or Firm* — Michael Best & Friedrich LLP

(57) ABSTRACT

A single-piece hybrid droplet generator and nozzle component for serial crystallography. The single-piece hybrid droplet generator component including an internally-formed droplet-generation channel, an internally-formed sample channel, a nozzle, and a pair of electrode chambers. The droplet-generation channel extends from a first fluid inlet opening to the nozzle. The sample channel extends from a second fluid inlet opening to the droplet-generation channel and joins the droplet-generation channel at a junction. The nozzle is configured to eject a stream of segmented aqueous
(Continued)

droplets in a carrier fluid from the droplet-generation channel through a nozzle opening of the single-piece component. The pair of electrode chambers are positioned adjacent to the droplet-generation channel near the junction between the droplet-generation channel and the sample channel. The timing of sample droplets in the stream of fluid ejected through the nozzle is controlled by applying a triggering signal to electrodes positioned in the electrode chambers of the single-piece component.

20 Claims, 6 Drawing Sheets

Related U.S. Application Data

(60) Provisional application No. 62/847,729, filed on May 14, 2019.

(51) Int. Cl.
  *B01L 3/02* (2006.01)
  *G01N 23/20025* (2018.01)
  *G01N 23/201* (2018.01)
  *G01N 35/10* (2006.01)

(52) U.S. Cl.
  CPC ....... *G01N 23/201* (2013.01); *G01N 35/1016* (2013.01); *B01L 2300/0645* (2013.01); *G01N 2035/1034* (2013.01); *G01N 2223/054* (2013.01); *G01N 2223/1016* (2013.01); *G01N 2223/203* (2013.01); *G01N 2223/30* (2013.01); *G01N 2223/604* (2013.01); *G01N 2223/612* (2013.01); *G01N 2223/637* (2013.01)

(58) Field of Classification Search
  CPC ..... G01N 2223/054; G01N 2223/1016; G01N 2223/203; G01N 2223/30; G01N 2223/604; G01N 2223/612; G01N 2223/637; B01L 3/0241; B01L 3/502715; B01L 2300/0645
  USPC .......................................................... 378/73
  See application file for complete search history.

(56) References Cited

U.S. PATENT DOCUMENTS

| | | | |
|---|---|---|---|
| 10,969,350 B2 | 4/2021 | Ros et al. | |
| 11,485,632 B2 | 11/2022 | Ros et al. | |
| 11,867,644 B2 | 1/2024 | Ros | |
| 2010/0173394 A1 | 7/2010 | Colston, Jr. et al. | |
| 2012/0108721 A1 | 5/2012 | Mazutis | |
| 2012/0196288 A1 | 8/2012 | Beer | |
| 2015/0258520 A1 | 9/2015 | Griffiths et al. | |
| 2016/0136643 A1 | 5/2016 | Larson | |
| 2018/0193829 A1 | 7/2018 | Boitard et al. | |
| 2018/0321130 A1 | 11/2018 | Wu | |

OTHER PUBLICATIONS

Boyes-Watson, J., et al. "An X-ray study of horse methaemoglobin. I." Proceedings of the Royal Society of London. Series A. Mathematical and Physical Sciences 191.1024 (1947): 83-132.
Brown, D. M., et al. "Structure and properties of nucleic acids and nucleoproteins. An informal discussion." Transactions of the Faraday Society 50 (1954): 290-305.
Cooper, J. B., et al. "Inhibitors of aspartic proteinases and their relevance to the design of antihypertensive agents." (1987): 751-754.
Deisenhofer, J. et al. "The photosynthetic reaction center from the purple bacterium *Rhodopseudomonas viridis*." Science 245.4925 (1989): 1463-1473.
Desy Dt. Elektr.-Synchr., H., XFEL: The European X-ray Free-Electron Laser. Technical design report. 2006; p. 630.
Doppler, D.; et al., Modular droplet injector for sample conservation providing new structural insight for the conformational heterogeneity in the disease-associated NQO1 enzyme. Lab Chip 2023, 23 (13), 3016-3033.
Gañán-Calvo, A. M. "Generation of steady liquid microthreads and micron-sized monodisperse sprays in gas streams." Physical review letters 80.2 (1998): 285.
Garman, E. F., et al. "Radiation damage in macromolecular crystallography." Protein Crystallography: Methods and Protocols (2017): 467-489.
Abdallah, B. G., et al. "Protein crystallization in an actuated microfluidic nanowell device." Crystal growth & design 16.4 (2016): 2074-2082.
Adams, P. D., et al. "PHENIX: a comprehensive Python-based system for macromolecular structure solution." Acta Crystallographica Section D: Biological Crystallography 66.2 (2010): 213-221.
Allahgholi, A., et al. "The adaptive gain integrating pixel detector at the European XFEL." Synchrotron Radiation 26.1 (2019): 74-82.
Anoz-Carbonell, E., et al. "The catalytic cycle of the antioxidant and cancer-associated human NQO1 enzyme: Hydride transfer, conformational dynamics and functional cooperativity." Antioxidants 9.9 (2020): 772.
Asher, G., et al. "A mechanism of ubiquitin-independent proteasomal degradation of the tumor suppressors p53 and p73." Genes & development 19.3 (2005): 316-321.
Ayan, E., et al. "Cooperative allostery and structural dynamics of streptavidin at cryogenic- and ambient-temperature." Communications biology 5.1 (2022): 73.
Barends, TRM, et al. "Serial femtosecond crystallography." Nature reviews Methods primers 2.1 (2022): 59.
Barty, A., et al. "Cheetah: software for high-throughput reduction and analysis of serial femtosecond X-ray diffraction data." Journal of applied crystallography 47.3 (2014): 1118-1131.
Battye, T. G. G., et al. "iMOSFLM: a new graphical interface for diffraction-image processing with MOSFLM." Acta Crystallographica Section D: Biological Crystallography 67.4 (2011): 271-281.
Beaver, S. K., et al. "NQO1: A target for the treatment of cancer and neurological diseases, and a model to understand loss of function disease mechanisms." Biochimica et Biophysica Acta (BBA)—Proteins and Proteomics 1867.7-8 (2019): 663-676.
Bianchet, M. F., M. ; et al., Structure and Mechanism of NAD[P]H: Quinone Acceptor Oxidoreductases (NQO). Methods in Enzymology 2004, 382.
Botha, S.; et al., Room-temperature serial crystallography at synchrotron X-ray sources using slowly flowing free-standing high-viscosity microstreams. Acta Crystallogr D Biol Crystallogr 2015, 71 (Pt 2), 387-97.
Botha, S.; et al., Review of serial femtosecond crystallography including the COVID-19 pandemic impact and future outlook. Structure 2023, 31 (11), 1306-1319.
Calvey, G. D., et al. "Mixing injector enables time-resolved crystallography with high hit rate at X-ray free electron lasers." Structural Dynamics 3.5 (2016), 054301.
Cerantola, V., et al. "New frontiers in extreme conditions science at synchrotrons and free electron lasers." Journal of Physics: Condensed Matter 33.27 (2021): 274003.
Cheng, R., Towards an Optimal Sample Delivery Method for Serial Crystallography at XFEL. Crystals 2020, 10 (3).
Claveria-Gimeno, R.; et al., Thermodynamics of cooperative binding of FAD to human NQO1: Implications to understanding cofactor-dependent function and stability of the flavoproteome. Arch Biochem Biophys 2017, 636, 17-27.
Cohen, A. E.; et al., Goniometer-based femtosecond crystallography with X-ray free electron lasers. Proc Natl Acad Sci U S A 2014, 111 (48), 17122-7.
Conrad, C. E.; et al., A novel inert crystal delivery medium for serial femtosecond crystallography. IUCrJ 2015, 2 (Pt 4), 421-30.

(56) References Cited

OTHER PUBLICATIONS

Crowfoot, D.. "X-ray single crystal photographs of insulin." Nature 135.591 (1935): e592.
Denz, M., et al. "Cyclic olefin copolymer as an X-ray compatible material for microfluidic devices." Lab on a Chip 18.1 (2018): 171-178.
Deponte, D. P., et al. "Gas dynamic virtual nozzle for generation of microscopic droplet streams." Journal of Physics D: Applied Physics 41.19 (2008): 195505.
Doak, R. B., et al. "Crystallography on a chip-without the chip: sheet-on-sheet sandwich." Acta Crystallographica Section D: Structural Biology 74.10 (2018): 1000-1007.
Doppler, D., et al. "Co-flow injection for serial crystallography at X-ray free-electron lasers." Journal of applied crystallography 55.1 (2022): 1-13.
Drenth, J. (2007). X-ray Sources and Detectors. In: Principles of Protein X-Ray Crystallography. Springer, New York, NY, pp. 21-44.
Echelmeier, A. et als. "Microfluidic sample delivery for serial crystallography using XFELs." Analytical and bioanalytical chemistry 411 (2019): 6535-6547.
Echelmeier, A., et al. "3D printed droplet generation devices for serial femtosecond crystallography enabled by surface coating." Journal of applied crystallography 52.5 (2019): 997-1008.
Echelmeier, A., et al. "Segmented flow generator for serial crystallography at the European X-ray free electron laser." Nature communications 11.1 (2020): 4511.
Emma, P., et al. "First lasing and operation of an ångstrom-wavelength free-electron laser." nature photonics 4.9 (2010): 641-647.
Emsley, P. et al. "Features and development of Coot." Acta Crystallographica Section D: Biological Crystallography 66.4 (2010): 486-501.
Evans, P. R., An introduction to data reduction: space-group determination, scaling and intensity statistics. Acta Crystallogr D Biol Crystallogr 2011, 67 (Pt 4), 282-92.
Faig, M., et al. "Structures of recombinant human and mouse NAD (P) H: quinone oxidoreductases: species comparison and structural changes with substrate binding and release." Proceedings of the National Academy of Sciences 97.7 (2000): 3177-3182.
Fenalti, G., et al. "Structural basis for bifunctional peptide recognition at human o-opioid receptor." Nature structural & molecular biology 22.3 (2015): 265-268.
Fischer, M. "Macromolecular room temperature crystallography." Quarterly Reviews of Biophysics 54 (2021): e1.
Fuller, F. D., et al. "Drop-on-demand sample delivery for studying biocatalysts in action at X-ray free-electron lasers." Nature methods 14.4 (2017): 443-449.
Gevorkov, Y., et al. "XGANDALF—extended gradient descent algorithm for lattice finding." Acta Crystallographica Section A: Foundations and Advances 75.5 (2019): 694-704.
Gisriel, C., et al. "Membrane protein megahertz crystallography at the European XFEL." Nature communications 10.1 (2019): 5021.
Grieco, A.; et al., Structural dynamics and functional cooperativity of human NQO1 by ambient temperature serial crystallography and simulations. Protein Sci 2024, 33 (4), e4957.
Hauf, S., et al. "The Karabo distributed control system." Journal of synchrotron radiation 26.5 (2019): 1448-1461.
Hejazian, M., et al. "Mixing and jetting analysis using continuous flow microfluidic sample delivery devices." RSC advances 10.27 (2020): 15694-15701.
Hejazian, M.; et al., Recent Advances and Future Perspectives on Microfluidic Mix-and-Jet Sample Delivery Devices. Micromachines (Basel) 2021, 12 (5).
Petsko, G. A. "Protein crystallography at sub-zero temperatures: cryo-protective mother liquors for protein crystals." Journal of molecular biology 96.3 (1975): 381-392.
Pey, A. L., et al. "Natural small molecules as stabilizers and activators of cancer-associated NQO1 polymorphisms." Current Drug Targets 17.13 (2016): 1506-1514.
Pey, A. L.; et al., FAD binding overcomes defects in activity and stability displayed by cancer-associated variants of human NQO1. Biochim Biophys Acta 2014, 1842 (11), 2163-73.
Pidugu, L. S. M., et al. "A direct interaction between NQO1 and a chemotherapeutic dimeric naphthoquinone." BMC structural biology 16 (2016): 1-10.
Powell, H. R.; et al., Autoindexing diffraction images with iMosflm. Acta Crystallogr D Biol Crystallogr 2013, 69 (Pt 7), 1195-203.
Rasmussen, SGF, et al. "Crystal structure of the β2 adrenergic receptor-Gs protein complex." Nature 477.7366 (2011): 549-555.
Roedig, P., et al. "High-speed fixed-target serial virus crystallography." Nature methods 14.8 (2017): 805-810.
Ross, D. et al. "Functions of NQO1 in cellular protection and CoQ10 metabolism and its potential role as a redox sensitive molecular switch." Frontiers in physiology 8 (2017): 595.
Ruiz et al. J. Med. Chem, 2014, 57 (9), 3623-3650.
Sali, A., et al. "High-resolution X-ray diffraction study of the complex between endothiapepsin and an oligopeptide inhibitor: the analysis of the inhibitor binding and description of the rigid body shift in the enzyme." The EMBO Journal 8.8 (1989): 2179-2188.
Salido, E., et al. "Targeting HIF-1α function in cancer through the chaperone action of NQO1: implications of genetic diversity of NQO1." Journal of personalized medicine 12.5 (2022): 747.
Schieferstein, J. M., et al. "X-ray transparent microfluidic platforms for membrane protein crystallization with microseeds." Lab on a Chip 18.6 (2018): 944-954.
Schmidt, M., Mix and Inject: Reaction Initiation by Diffusion for Time-Resolved Macromolecular Crystallography. Advances in Condensed Matter Physics 2013, 2013, 1-10.
Schulz, J.; et al., A versatile liquid-jet setup for the European XFEL. J Synchrotron Radiat 2019, 26 (Pt 2), 339-345.
Schwandt, J.; et al., Design of the AGIPD sensor for the European XFEL. Journal of Instrumentation 2013, 8 (01), C01015-C01015.
Shelby, M. L., et al. "A fixed-target platform for serial femtosecond crystallography in a hydrated environment." IUCrJ 7.1 (2020): 30-41.
Sierra, R. G., et al. "Nanoflow electrospinning serial femtosecond crystallography." Acta Crystallographica Section D: Biological Crystallography 68.11 (2012): 1584-1587.
Sierra, R.G., et al. "Concentric-flow electrokinetic injector enables serial crystallography of ribosome and photosystem II." Nature methods 13.1 (2016): 59-62.
Siritanaratkul, B.; et al., Transfer of photosynthetic NADP(+)/NADPH recycling activity to a porous metal oxide for highly specific, electrochemically-driven organic synthesis. Chem Sci 2017, 8 (6), 4579-4586.
Smith, N.; et al., Changes in an Enzyme Ensemble During Catalysis Observed by High Resolution XFEL Crystallography. bioRxiv 2023.
Sonker, M.; et al., Electrically stimulated droplet injector for reduced sample consumption in serial crystallography. Biophys Rep (N Y) 2022, 2 (4), 100081.
Srinivas, V., et al. "High-resolution XFEL structure of the soluble methane monooxygenase hydroxylase complex with its regulatory component at ambient temperature in two oxidation states." Journal of the American Chemical Society 142.33 (2020): 14249-14266.
Stagno, J. R., et al. "Structures of riboswitch RNA reaction states by mix-and-inject XFEL serial crystallography." Nature 541.7636 (2017): 242-246.
Stubbs, J.; et al., Droplet microfluidics for time-resolved serial crystallography. IUCrJ 2024, 11 (Pt 2), 237-248.
Sugahara, M., et al. "Grease matrix as a versatile carrier of proteins for serial crystallography." Nature methods 12.1 (2015): 61-63.
Sugahara, M., et al. "Oil-free hyaluronic acid matrix for serial femtosecond crystallography." Scientific reports 6.1 (2016): 24484.
Suno, R., et al. "Crystal structures of human orexin 2 receptor bound to the subtype-selective antagonist EMPA." Structure 26.1 (2018): 7-19.
Vagin, A.; et al., MOLREP: an Automated Program for Molecular Replacement. Journal of Applied Crystallography 1997, 30, 1022-1025.

(56) References Cited

OTHER PUBLICATIONS

Vakili, M.; et al., 3D printed devices and infrastructure for liquid sample delivery at the European XFEL. J Synchrotron Radiat 2022, 29 (Pt 2), 331-346.
Van Driel, T. B., et al. "The ePix10k 2-megapixel hard X-ray detector at LCLS." Journal of synchrotron radiation 27.3 (2020): 608-615.
Vankova, P., et al. "A dynamic core in human NQO1 controls the functional and stability effects of ligand binding and their communication across the enzyme dimer." Biomolecules 9.11 (2019): 728.
Vega, S., et al. "On the link between conformational changes, ligand binding and heat capacity." Biochimica et Biophysica Acta (BBA)—General Subjects 1860.5 (2016): 868-878.
Weierstall, U.; et al., Lipidic cubic phase injector facilitates membrane protein serial femtosecond crystallography. Nat Commun 2014, 5, 3309.
White, T. A., Processing serial crystallography data with CrystFEL: a step-by-step guide. Acta Crystallogr D Struct Biol 2019, 75 (Pt 2), 219-233.
White, T. A.; et al., CrystFEL: a software suite for snapshot serial crystallography. Journal of Applied Crystallography 2012, 45 (2), 335-341.
Winn, M. D.; et al., Overview of the CCP4 suite and current developments. Acta Crystallogr D Biol Crystallogr 2011, 67 (Pt 4), 235-42.
Wolff, A. M., et al. "Comparing serial X-ray crystallography and microcrystal electron diffraction (MicroED) as methods for routine structure determination from small macromolecular crystals." IUCrJ 7.2 (2020): 306-323.
Xu, J. H.; et al., Correlations of droplet formation in T-junction microfluidic devices: from squeezing to dripping. Microfluidics and Nanofluidics 2008, 5 (6), 711-717.
Hodgkin, D. C. "The X-ray analysis of the structure of penicillin." Advancement of science 6.22 (1949): 85-89.
Hunter, M. S., et al. "Fixed-target protein serial microcrystallography with an x-ray free electron laser." Scientific reports 4.1 (2014): 6026.
Hunter, M. S., et al. "Serial femtosecond crystallography (SFX): an overview." X-ray Free Electron Lasers: A Revolution in Structural Biology (2018): 23-58.
Ishigami, I., et al. "Snapshot of an oxygen intermediate in the catalytic reaction of cytochrome c oxidase." Proceedings of the National Academy of Sciences 116.9 (2019): 3572-3577.
Jernigan, R. J., et al. "Room-temperature structural studies of SARS-CoV-2 protein NendoU with an X-ray free-electron laser." Structure 31.2 (2023): 138-151.
Kabsch, W., Xds. Acta Crystallogr D Biol Crystallogr 2010, 66 (Pt 2), 125-32.
Karpik, A., et al. Micro and Nano Engineering, 2020, 7, 100053.
Kim, D., et al. "Electric triggering for enhanced control of droplet generation." Analytical chemistry 91.15 (2019): 9792-9799.
Knoška, J., et al. "Ultracompact 3D microfluidics for time-resolved structural biology." Nature communications 11.1 (2020): 657.
Kovácsová, G., et al. "Viscous hydrophilic injection matrices for serial crystallography." IUCrJ 4.4 (2017): 400-410.
Kulkarni, C. V., et al. "Monoolein: a magic lipid?." Physical Chemistry Chemical Physics 13.8 (2011): 3004-3021.
Kupitz, C. et al. Philosophical transactions of the Royal Society of London. Series B, Biological sciences, 2014, 369.
Kupitz, C., et al. "Structural enzymology using X-ray free electron lasers." Structural Dynamics 4.4 (2017). 044003.
Lahey-Rudolph, J. M., et al. "Fixed-target serial femtosecond crystallography using in cellulo grown microcrystals." IUCrJ 8.4 (2021): 665-677.
Lee, D., et al. "Application of a high-throughput microcrystal delivery system to serial femtosecond crystallography." Journal of applied crystallography 53.2 (2020): 477-485.
Li, R., et al. "The three-dimensional structure of NAD (P) H: quinone reductase, a flavoprotein involved in cancer chemoprotection and chemotherapy: mechanism of the two-electron reduction." Proceedings of the National Academy of Sciences 92.19 (1995): 8846-8850.
Lienhart, W.-D., et al. "Catalytic competence, structure and stability of the cancer-associated R139W variant of the human NAD (P) H: quinone oxidoreductase 1 (NQO 1)." The FEBS journal 284.8 (2017): 1233-1245.
Liu, W., et al. "Femtosecond crystallography of membrane proteins in the lipidic cubic phase." Philosophical Transactions of the Royal Society B: Biological Sciences 369. 1647 (2014): 20130314.
Liu, W., et al. "Serial femtosecond crystallography of G protein-coupled receptors." Science 342.6165 (2013): 1521-1524.
Löf, A. et al. Resource rents in the diamond industry 2014-19: Rents, issues, methods, and data availability. No. 2021/39. WIDER Working Paper, 2021.
Lomb, L., et al. "An anti-settling sample delivery instrument for serial femtosecond crystallography." Journal of applied crystallography 45.4 (2012): 674-678.
Lomb, L., et al. "Radiation damage in protein serial femtosecond crystallography using an x-ray free-electron laser." Physical Review B—Condensed Matter and Materials Physics 84.21 (2011): 214111.
Lyubimov, A. Y., et al. "Capture and X-ray diffraction studies of protein microcrystals in a microfluidic trap array." Acta Crystallographica Section D: Biological Crystallography 71.4 (2015): 928-940.
Ma, Q., et al. "Identification of a glycine-rich sequence as an NAD (P) H-binding site and tyrosine 128 as a dicumarol-binding site in rat liver NAD (P) H: quinone oxidoreductase by site-directed mutagenesis." Journal of Biological Chemistry 267.31 (1992): 22298-22304.
Malla, T. N., et al. "Heterogeneity in M. tuberculosis β-lactamase inhibition by Sulbactam." Nature communications 14.1 (2023): 5507.
Mariani, V.; et al., OnDA: online data analysis and feedback for serial X-ray imaging. J Appl Crystallogr 2016, 49 (Pt 3), 1073-1080.
Martiel, I. et al. "Strategies for sample delivery for femtosecond crystallography." Biological Crystallography 75.2 (2019): 160-177.
Martin-Garcia, J. M., et al. "Serial macromolecular crystallography at ALBA Synchrotron Light Source. Erratum." Journal of synchrotron radiation 29.4 (2022): 1130-1130.
Martin-Garcia, J. M.; et al., High-viscosity injector-based pink-beam serial crystallography of microcrystals at a synchrotron radiation source. IUCrJ 2019, 6 (Pt 3), 412-425.
Martin-Garcia, J. M.; et al., Serial millisecond crystallography of membrane and soluble protein microcrystals using synchrotron radiation. IUCrJ 2017, 4 (Pt 4), 439-454.
Mccoy, A. J., et al. "Phaser crystallographic software." Journal of applied crystallography 40.4 (2007): 658-674.
Medina-Carmona, E., et al. "Enhanced vulnerability of human proteins towards disease-associated inactivation through divergent evolution." Human molecular genetics 26.18 (2017): 3531-3544.
Megarity, C. F., et al. "Negative cooperativity in NAD (P) H quinone oxidoreductase 1 (NQO1)." ChemBioChem 20.22 (2019): 2841-2849.
Mehlman, T. S., et al. "Room-temperature crystallography reveals altered binding of small-molecule fragments to PTP1B." Elife 12 (2023): e84632.
Mills, G.; et al., First Experiments in Structural Biology at the European X-ray Free-Electron Laser. Applied Sciences 2020, 10 (10).
Mueller, C., et al. "Fixed target matrix for femtosecond time-resolved and in situ serial micro-crystallography." Structural Dynamics 2.5 (2015).
Murshudov, G. N.; et al., REFMAC5 for the refinement of macromolecular crystal structures. Acta Crystallogr D Biol Crystallogr 2011, 67 (Pt 4), 355-67.
Nass, K., et al. "Structural dynamics in proteins induced by and probed with X-ray free-electron laser pulses." Nature Communications 11.1 (2020): 1814.
Nazari, R.; et al., 3D printing of gas-dynamic virtual nozzles and optical characterization of high-speed microjets. Opt Express 2020, 28 (15), 21749-21765.

(56) References Cited

OTHER PUBLICATIONS

Neutze, R., et al. "Potential for biomolecular imaging with femtosecond X-ray pulses." Nature 406.6797 (2000): 752-757.

Oberthuer, D., et al. "Double-flow focused liquid injector for efficient serial femtosecond crystallography." Scientific reports 7.1 (2017): 44628.

Oghbaey, S., et al. "Fixed target combined with spectral mapping: approaching 100% hit rates for serial crystallography." Acta Crystallographica Section D: Structural Biology 72.8 (2016): 944-955.

Olmos, J. L., Jr.; et al., Enzyme intermediates captured "on the fly" by mix-and-inject serial crystallography. BMC Biol 2018, 16 (1), 59.

Pacheco-Garcia, J. L., et al. "Structural basis of the pleiotropic and specific phenotypic consequences of missense mutations in the multifunctional NAD (P) H: quinone oxidoreductase 1 and their pharmacological rescue." Redox Biology 46 (2021): 102112.

Pacheco-Garcia, J. L.; et al., Allosteric Communication in the Multifunctional and Redox NQO1 Protein Studied by Cavity-Making Mutations. Antioxidants (Basel) 2022, 11 (6).

Pacheco-Garcia, J. L.; et al., Counterintuitive structural and functional effects due to naturally occurring mutations targeting the active site of the disease-associated NQO1 enzyme. FEBS J 2023, 290 (7), 1855-1873.

Pan, D., et al. "Crystal structure of CmABCB1 multi-drug exporter in lipidic mesophase revealed by LCP-SFX." IUCrJ 9.1 (2022): 134-145.

Pandey, P.; et al., Potential Modulation of Human NAD[P]H-Quinone Oxidoreductase 1 (NQO1) by EGCG and Its Metabolites—A Systematic Computational Study. Chem Res Toxicol 2020, 33 (11), 2749-2764.

Pandey, S.; et al., Observation of substrate diffusion and ligand binding in enzyme crystals using high-repetition-rate mix-and-inject serial crystallography. IUCrJ 2021, 8 (Pt 6), 878-895.

Park, J.; et al., Recent chemical mixing devices for time-resolved serial femtosecond crystallography. TrAC Trends in Analytical Chemistry 2024, 172.

Holm, S. H., et al. "Separation of parasites from human blood using deterministic lateral displacement." Lab on a Chip 11.7 (2011): 1326-1332.

Loutherback, K., et al. "Improved performance of deterministic lateral displacement arrays with triangular posts." Microfluidics and nanofluidics 9 (2010): 1143-1149.

Lubbersen, Y. S., et al. "Suspension separation with deterministic ratchets at moderate Reynolds numbers." Chemical engineering science 73 (2012): 314-320.

Saenz C. Procedures for Bonding PDMs, Microfluidics, (Year: 2015) (2 pages).

* cited by examiner

US 12,287,299 B2

SINGLE PIECE DROPLET GENERATION AND INJECTION DEVICE FOR SERIAL CRYSTALLOGRAPHY

RELATED APPLICATIONS

This application is a continuation of U.S. patent application Ser. No. 15/930,313, filed May 12, 2020, which claims the benefit of U.S. Provisional Patent Application No. 62/847,729, filed May 14, 2019 and entitled "DROPLET GENERATION AND INJECTION FOR SERIAL CRYSTALLOGRAPHY," the entire contents of which are incorporated herein by reference.

STATEMENT REGARDING FEDERALLY SPONSORED RESEARCH OR DEVELOPMENT

This invention was made with government support under R01 GM095583 awarded by the National Institutes of Health and under 1231306 awarded by the National Science Foundation. The government has certain rights in the invention.

BACKGROUND

The present invention relates to systems and methods for crystallography. More specifically, this invention relates to systems and methods for generating a sample stream for serial crystallography.

SUMMARY

Serial femtosecond crystallography (SFX) is used to determine the structure of macromolecules at ambient temperature and, in some implementations, enables the study of large membrane protein complexes at atomic resolution and reaction dynamics of the same, which was generally unable to be done using traditional crystallographic methods. In SFX experiments with X-Ray fee electron lasers (XFELs), sample crystals are positioned in the beam of the XFEL. Each crystal hit by the XFEL is destroyed and the sample needs to be replenished between X-ray pulses. In some implementations, this is accomplished by a continuous injection of crystal suspension. Large amounts of sample are required to collect a complete X-ray diffraction data set for high-resolution crystal structures. Additionally, any crystal samples delivered in the path of the X-ray beam during its "off-time" (i.e., time between pulses) is wasted due to the intrinsic pulsed nature of XFELs. In some cases, up to one gram of protein may be required for the continuous injection stream and, of that one gram, up to 99% of the protein is wasted between pulses. Accordingly, in some cases, sample preparation constitutes a major limiting factor for SFX with XFELs.

In some implementations, a device for use in a hybrid droplet generator includes a first channel, a second channel, a third channel, and an outlet passage. The second channel is in communication with the first channel via a junction. The outlet passage is disposed downstream from the junction. The third channel is in communication with the outlet passage. The device also includes electrodes that are coupled to the outlet passage. The electrodes are configured to provide an electric current to a stream of segmented aqueous droplets in a carrier fluid flowing through the junction.

In other embodiments, a device for use in a hybrid droplet generator includes a first channel, a second channel, a third channel, and electrodes. The second channel is in communication with the first channel via a T-junction. The third channel is concentric with the first channel and in communication with the first channel and the second channel downstream of the T-junction. The electrodes are coupled to at least one of the first channel and the second channel. The electrodes are configured to provide an electric current to a stream flowing through the junction.

In one embodiment, the invention provides a single-piece hybrid droplet generator and nozzle component for serial crystallography. The single-piece hybrid droplet generator component including an internally-formed droplet-generation channel, an internally-formed sample channel, a nozzle, and a pair of electrode chambers. The droplet-generation channel extends from a first fluid inlet opening to the nozzle. The sample channel extends from a second fluid inlet opening to the droplet-generation channel and joins the droplet-generation channel at a junction. The nozzle is configured to eject a fluid from the droplet-generation channel through a nozzle opening of the single-piece component. The pair of electrode chambers are positioned adjacent to the droplet-generation channel near the junction between the droplet-generation channel and the sample channel. The timing of sample droplets in the stream of fluid ejected through the nozzle is controlled by applying a triggering signal to electrodes positioned in the electrode chambers of the single-piece component.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
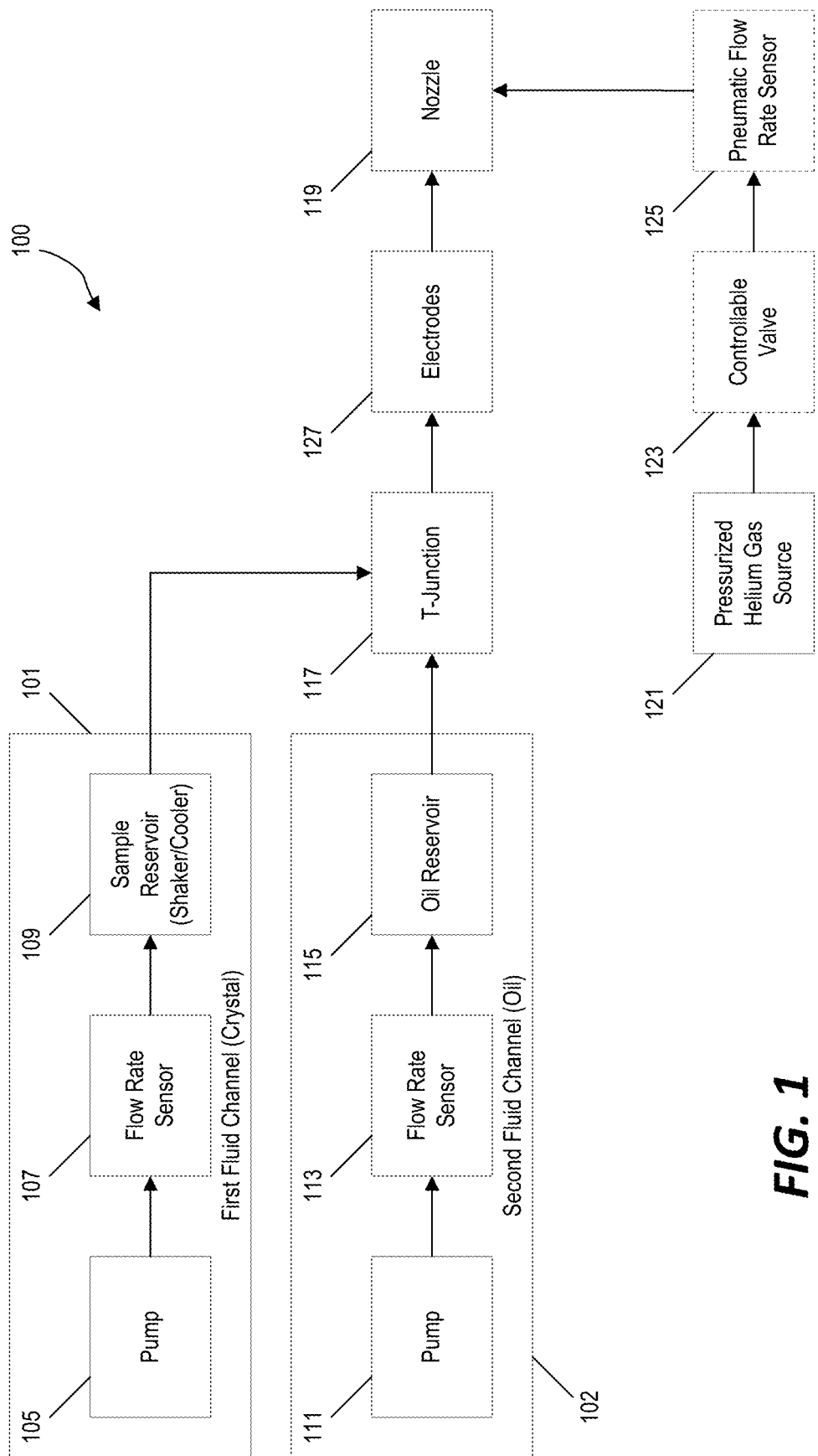
FIG. 1 is a block diagram of a sample injection system for serial crystallography.

FIG. 1 illustrates an example of a sample ejection system 100 that provides for controlled generation of a stream of segmented aqueous droplets in a carrier fluid and ejection of a stream. For example, the system 100 may be configured for "water-in-oil" droplet generation of a crystal sample (suspended in a fluid media) as a sequence of droplets in a stream of oil fluid in order to inject the aqueous droplets with the sample into an X-ray beam for serial crystallography. The system 100 also includes an electrode configuration in order to controllably synchronize the flow of droplets with the pulse rate of the X-ray beam.

The system 100 of FIG. 1 includes a first fluid channel 101 and a second fluid channel 102. The first fluid channel 101 includes a pump 105, a flow rate sensor 107, and a sample reservoir 109. The pump 105 is operated to move fluid from the sample reservoir 107 through the first fluid channel 101. By monitoring the output of the flow rate sensor 107 and using the output of the flow rate sensor 107 as control feedback, the pump 105 can be adjusted to controllably regulate the rate of fluid flow from the sample reservoir 109. In some implementations, the sample reservoir 109 may further include a shaker or cooler mechanism for preparing and/or maintaining the sample before it is pumped through the first fluid channel 101. The second fluid channel 102 similarly includes a pump 111, a flow rate sensor 113, and an oil reservoir 115. The pump 111 is controllably operated based on an output signal of the flow rate sensor 113 to control the rate at which fluid is pumped from the oil reservoir 115 through the second fluid channel 102.

In some implementations, the sample reservoir 109 is configured to hold a volume of a crystal sample suspended in an aqueous fluid (e.g., water) and the oil reservoir 115 is configured to hold an oil. The fluids from each of the two fluid channels 101, 102 are pumped towards a T-junction 117 where they are combined in the same output channel as a stream of segmented aqueous droplets in a carrier fluid (as described further below) towards a nozzle 119. In some implementations, the nozzle 119 is a gas dynamic virtual nozzle (GDVN) configured to receive pressurized helium gas from a pressurized helium gas source 121. In some implementations, the system 100 also includes a controllable pneumatic valve 123 to regulate a flow rate of the pressurized helium gas from the source 121 and a pneumatic flow rate sensor 125 to measure the actual pneumatic flow of helium gas towards the nozzle 119 so that the position of the controllable valve 123 can be adjusted towards a target pneumatic flow rate. The nozzle 119 is configured to emit the combined fluid stream and the pressurized helium gas coaxially with the combined fluid stream at the center of the pressurized helium gas flow, which results in a "jetting" of the fluid output stream.

By controlling the flow rate of the sample suspension fluid (through the first fluid channel 101) and the flow rate of the oil (through the second fluid channel 102), the system can be operated to controllably introduce the sample suspension fluid into the oil stream as a series of droplets. As described in further detail below, an electrode configuration (i.e., electrodes 127) is positioned and configured to apply an electrical signal to the fluid stream that effectively regulates the position, sequence, and synchronization of the sample droplets in the output fluid stream that is ejected from the nozzle 119. In some implementations, the electrodes 127 are configured as "non-contact electrodes" that do not physically contact the fluid stream and may be made from gallium, silver, or another suitable material. The electrodes 127 induce local electric fields that change the water-in-oil interface and trigger the change of droplet generation frequency.

Figure 2:
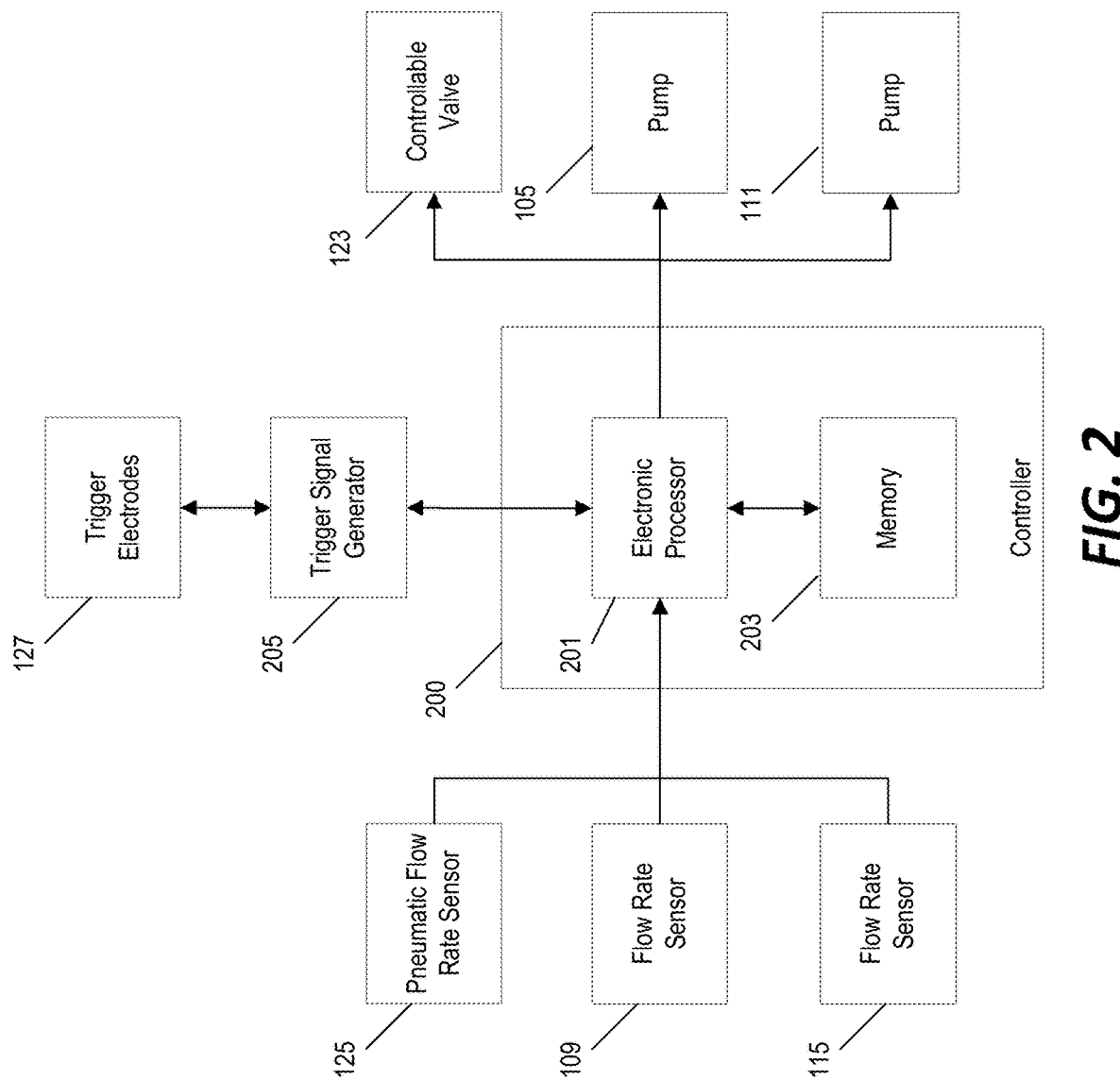
FIG. 2 is a block diagram of a control system for the sample injection system of FIG. 1.

FIG. 2 illustrates an example of a control system for the system 100 of FIG. 1. A controller 200 includes an electronic processor 201 and a non-transitory, computer-readable memory 203. The memory 203 stores data and computer-executable instructions that are accessed & executed by the electronic processor 201 to provide the functionality of the controller 200 (including, for example, the functionality described herein). The controller 200 may be implemented, for example, as a desktop computer system or as an application-specific system.

The controller 200 is communicatively coupled to the pump 105 of the first fluid channel 101, the pump 111 of the second fluid channel 102, and the controllable pneumatic valve 123 and provides control signal that regulate/adjust the operation of these components. The controller 200 is also communicatively coupled to the flow rate sensor 109 of the first fluid channel 101, the flow rate sensor 115 of the second fluid channel 102, and the pneumatic flow rate sensor 125. Accordingly, in some implementations, the control 200 operates the system 100 to achieve target fluid flow rates in the first fluid channel 101 & the second fluid channel 102 and to provide a target pneumatic flow/pressure of the helium gas provided to the nozzle 119 by adjusting the control signals provided to the pump 105, the pump 111, and the controllable valve 123 based, at least in part, on the sensor signals received from the flow rate sensors 109, 115, 125. The controller 200 is also communicatively coupled to a trigger signal generator 205 that is configured to generate a trigger signal that is applied to the trigger electrodes 127 in order to controllably regulate the droplet generation frequency of the system 100.

Furthermore, although FIG. 2 illustrates only a single controller 200, in some implementations, a plurality of controllers may be configured to provide the functionality and processing for the system 100. For example, in some implementations, a separate controller is implemented to regulating the pneumatic components independently from the droplet generation functionality. In some such implementations, the controllable valve 123 and the pneumatic flow rate sensor 125 are communicative coupled to a separate controller, which is configured to provide for pneumatic control and to regulate a gas mass flow rate in order to establish a properly formed "jet" from the nozzle, but does not provide any functionality related to droplet generation and triggering.

Figure 3A:
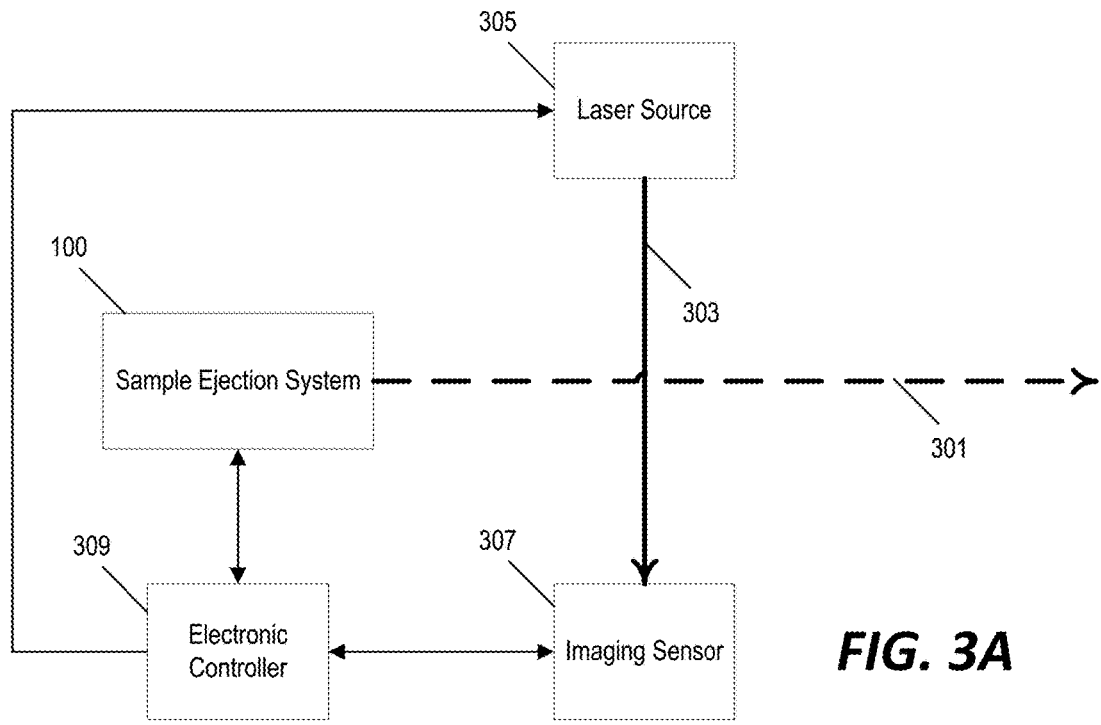
FIG. 3A is a schematic diagram of serial crystallography system including the sample injection system of FIG. 1.

FIG. 3A illustrates an example of the operational configuration of the sample ejection system 100 for serial crystallography. The sample ejection system 100 is controllably operated to eject a jetted fluid stream 301 through the optical path of an x-ray laser beam 303. The x-ray laser beam 303 is generated by a laser source 305 and diffraction of the x-ray laser beam 303 caused by the sample in the output stream 301 is captured by an imaging sensor 307. One or more electronic controllers 309 are communicatively coupled to the sample ejection system 100, the laser source 305, and the imaging sensor 307 to control the characteristics of the output stream 301 as well as receiving and processing image data from the imaging sensor 307 in order to determine a molecular structure (and, in some cases, other properties) of the sample crystal in the output stream 301. In some implementations, the electronic controller 309 (or a different, separate electronic controller) is configured to operate the x-ray laser beam 303 (e.g., controlling the on/off status of the laser source 305) and/or to receive information from the laser source 305 regarding the pulse timing of the laser beam 303.

As described above, the system 100 of FIG. 1 is controlled to produce an output stream 301 that includes a series of droplets in an oil fluid. The droplets include a crystal sample suspended in an aqueous medium (e.g., water). The droplets are introduced into the oil fluid stream at the T-junction 117 and certain characteristics of the droplets (including, for example, the size, frequency, etc.) can be controlled in part by adjusting the flow rate of the sample suspension and the oil fluid using pumps 105, 111. The properties of the crystals in the sample are determined by analyzing diffraction data of the x-ray laser beam interacting with the output stream 301. However, useful diffraction data is only obtained when the laser beam is diffracted by one of the sample suspension droplets. Sample droplets passing through the optical path of the x-ray laser beam 303 when the x-ray laser beam is between pulses are effectively wasted as they produce no useful diffraction data. Accordingly, the trigger electrodes 127 are controllably operated to apply an electrical signal to the stream of "water-in-oil" droplets at or near the T-junction 117.

Figure 3B:
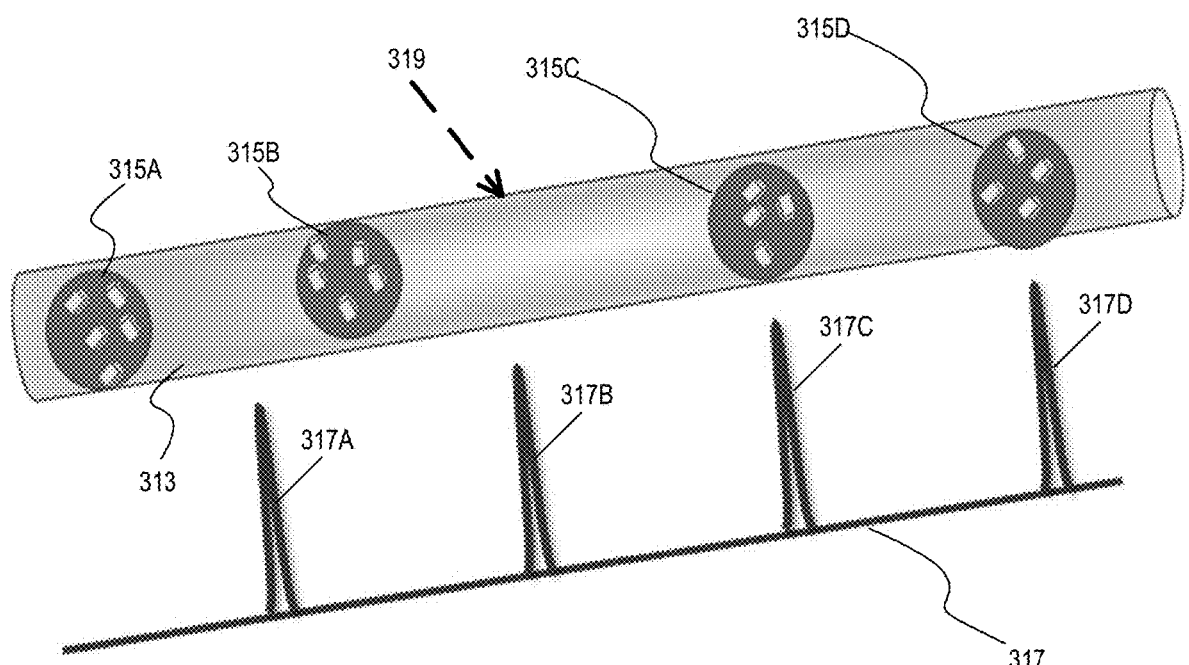
FIG. 3B is a schematic diagram of a triggering operation for synchronizing sample droplets in the output stream generated by the sample injection system of FIG. 1 with the laser beam pulses in the serial crystallography system of FIG. 3A.

FIG. 3B illustrates one example of the electrode-based triggering for synchronizing the droplet flow with the x-ray laser pulse. FIG. 3B shows the oil fluid stream 313 with a series of droplets 315A, 315B, 315C, 315D. A schematic example of the x-ray laser pulse signal 317 is illustrated adjacent to the water-in-oil stream. As shown in FIG. 3B, the first two droplets 315A, 315B are not appropriately synchronized with pulses 317A, 317B of the x-ray laser pulse signal 317. However, when the triggering signal 319 is applied to the "water-in-oil" droplet stream by the electrodes 127, the generation and release of sample suspension droplets 315C, 315D are controllably synchronized with the pulses 317C, 317D of the x-ray laser pulse signal 317. As a result, droplet 315C will reach the optical path of the x-ray laser beam 303 at the same time as the pulse 317C. Similarly, droplet 315D will be temporally synchronized with pulse 317D and will reach the optical path of the x-ray laser beam 303 at the same time as the pulse 317D. Further details and examples of operating electrodes to apply a triggering signal to synchronize droplets in a fluid stream with pulses of a laser beam are described in International Patent Publication No. WO 2018/217831, entitled "METAL ELECTRODE BASED 3D PRINTED DEVICE FOR TUNING MICROFLUIDIC DROPLET GENERATION FREQUENCY AND SYNCHRONIZING PHASE FOR SERIAL FEMTOSECOND CRYSTALLOGRAPHY," the entire contents of which are incorporated herein by reference.

FIGS. 4A through 4D illustrate a single-piece device 400 that provides electrode-based droplet generation with a T-junction and electrodes in close proximity to a gas dynamic virtual nozzle (GDVN) to inject a protein crystal sample for serial crystallography. In this single-piece device 400, the droplet triggering device and the gas dynamic virtual nozzle are integrated into a single piece. In some implementations, the device 400 is fabricated by 2-photon polymerization in a monolithic piece. However, in other implementations, different 3D printing, molding, or other fabrications techniques may be utilized. In some implementations, as described in further detail below, silica capillaries for liquid and gas delivery are coupled to the device and gallium or silver-based non-contact metal electrodes embedded into the 3D printed device are used to induce local electric fields that change the water-in-oil interface and trigger the change of droplet generation frequency. Droplets of aqueous crystal suspension are generated in immiscible fluorinated oil in a T-junction and are coaxially focused into a jet by helium gas in the nozzle in one device component. In some implementations, the droplet generation frequency can be modified from 10 Hz to 120 Hz by controlling the flow rate ratios and synchronization is achieved by applying the droplet generation trigger signal through the embedded electrodes.

Figure 4A:
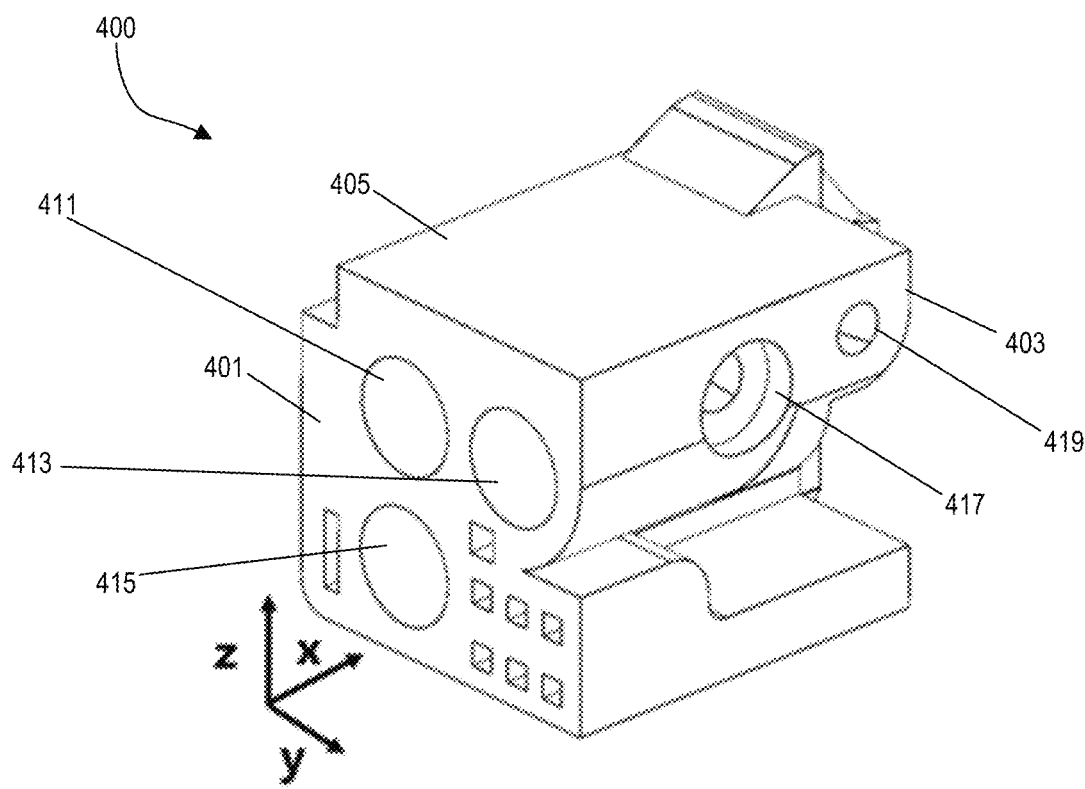
FIG. 4A is a perspective view of a single piece droplet generation and injection device for the sample injection system of FIG. 1 showing a rear surface and a first side surface of the device.
Figure 4B:
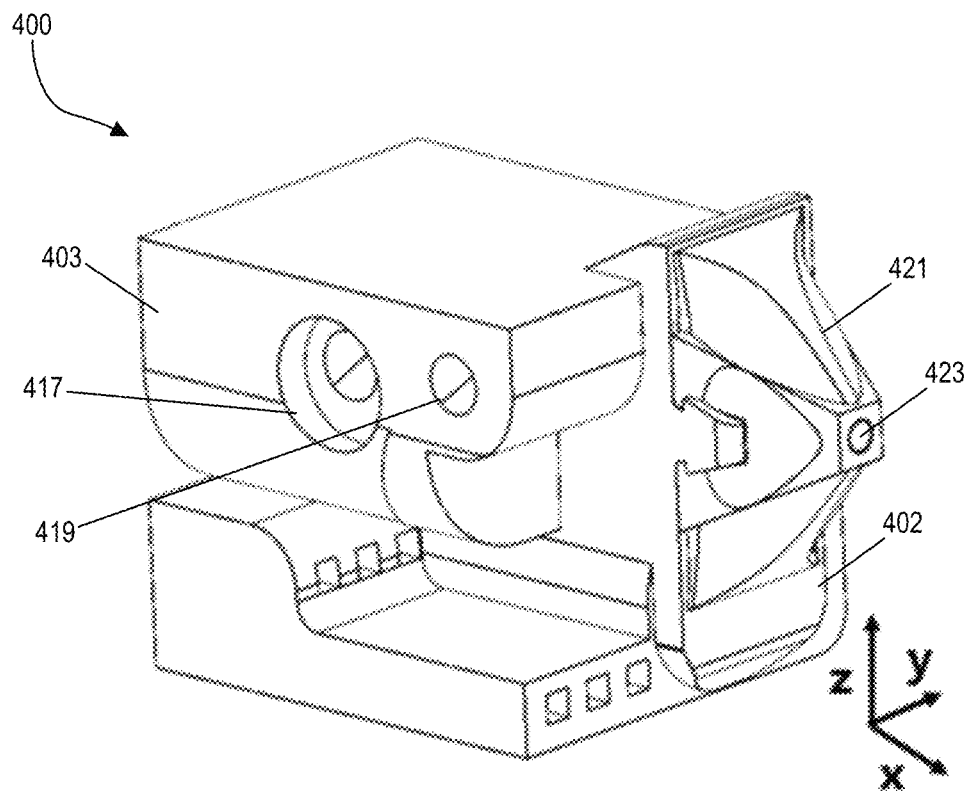
FIG. 4B is another perspective view of the single piece device of FIG. 4A showing the first side surface and a front surface of the device.
Figure 4C:
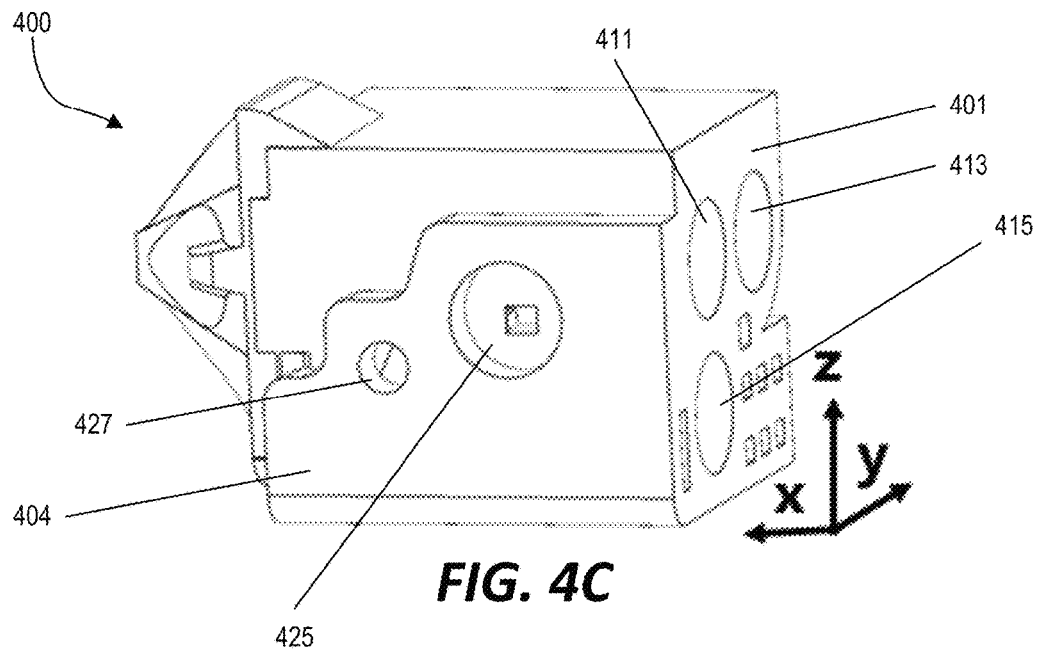
FIG. 4C is yet another perspective view of the single piece device of FIG. 4A showing the rear surface and a second side surface of the device.
Figure 4D:
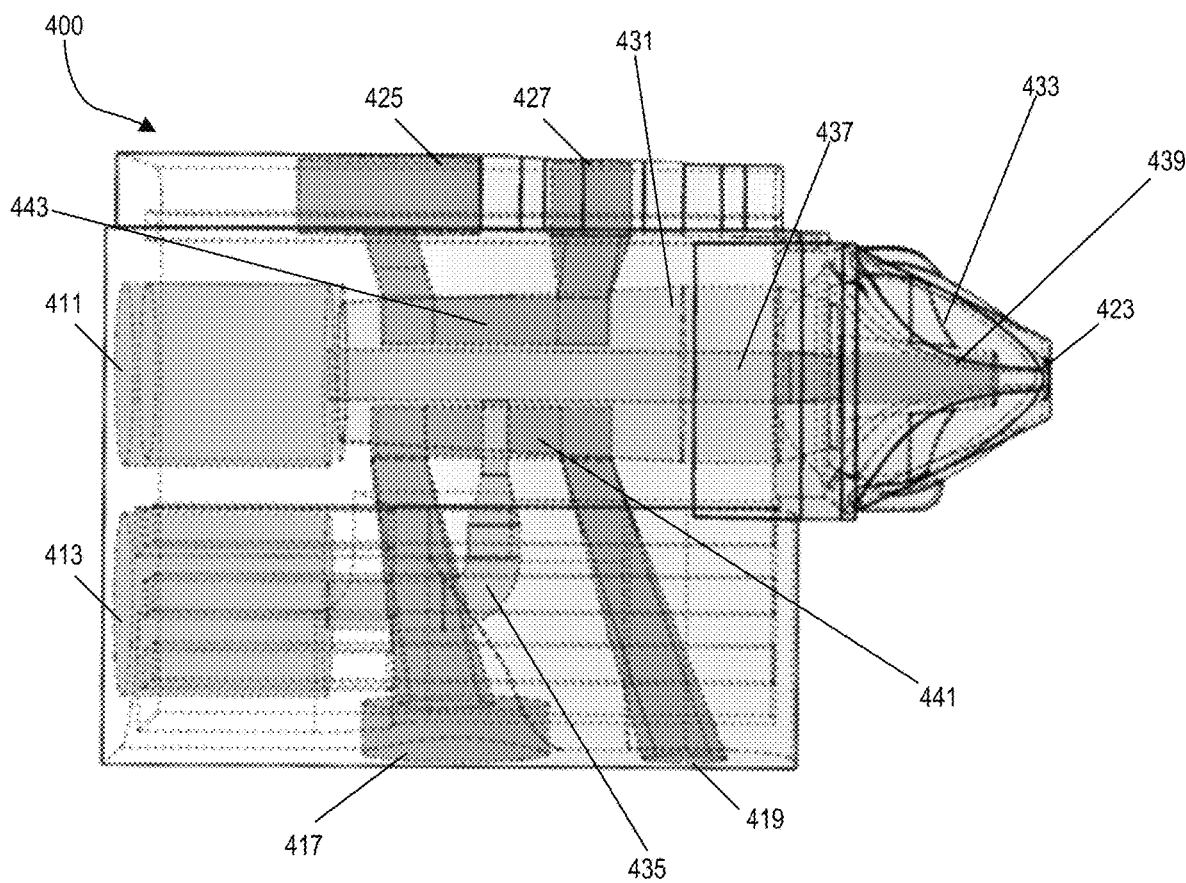
FIG. 4D is a partially transparent overhead view of the single piece device of FIG. 4A.

The single-piece device 400 in the example of FIGS. 4A through 4D has six exterior surfaces arranged in a substantially cuboid configuration: a rear surface 401, a front surface 402, a first side surface 403, a second side surface 404, a top surface 405, and a bottom surface (not shown). The perspective of FIG. 4A shows the rear surface 401, the first side surface 403, and the top surface 405. The perspective of FIG. 4B shows the front surface 402, the first side surface 403, and the top surface 405. The perspective of FIG. 4C shows the rear surface 401, the second side surface 404, and the top surface 405. FIG. 4D is a partially-transparent overhead view from the top surface 405 of the device 400 to illustrate the interior channels and structures of the device 400.

The rear surface 401 includes three channel opening inlets: a first fluid inlet opening 411, a second fluid inlet opening 413, and a gas inlet opening 415. The front surface 402 includes a nozzle protrusion 421 and a nozzle opening 423. The nozzle protrusion 421 is a tapered structure extending from the front surface 402 and terminating at a peak where the nozzle opening 423 is positioned. The first side surface 403 includes a pair of electrode openings 417, 419 and the second side surface 404 also includes a pair of electrode openings 425, 427.

As shown in FIG. 4D, the first fluid inlet opening 411, the second fluid inlet opening 413, and the gas inlet opening 415 extend into a body of the device 400 and are each configured to receive a tube or capillary that will supply a fluid or gas to the device 400. A gas channel 431 extends from the gas inlet opening 415 to an internal nozzle volume 433. The internal nozzle volume 433 is formed as a hollow chamber at least partially within the nozzle protrusion 421 and opens to the nozzle opening 423. Accordingly, pressurized air provided to the device 400 through the gas inlet opening 423 moves through the gas channel 431 into the internal nozzle volume 433 and exits the device 400 through the nozzle opening 523.

The fluid droplet-generation channel 437 extends from the first fluid inlet opening 411 towards a fluid outlet channel 439. The fluid outlet channel is formed as a hollow protrusion into the internal nozzle volume 433. The fluid outlet channel 439 includes an opening at its distal end positioned proximate to the nozzle opening 423. In some implementations, a first fluid (e.g., an oil fluid) is pumped into the device through the first fluid inlet opening 411, flows through the fluid droplet-generation channel 437 into the fluid outlet channel 439 where it is released towards the nozzle opening 423. The distal end of the fluid outlet channel 439 is positioned relative to the gas channel 431 in the internal nozzle volume 433 such that fluid exiting the fluid outlet channel 431 toward the nozzle opening 423 is coaxial with the pressurized gas that is exiting the internal nozzle volume through the nozzle opening 423. This coaxial arrangement with pressurized gas flow surrounding the fluid stream in the same output direction results in a "jetting" of the fluid stream through the nozzle opening 423.

A sample channel 435 is also formed within the device 400 coupling the second fluid inlet opening 413 to the fluid droplet-generation channel 437. In the specific example of FIGS. 4A through 4D, the first fluid inlet opening 411 and the second fluid inlet opening 413 are formed on the same surface of the device 400 (i.e., the rear surface 401). Accordingly, the sample channel 435 includes a curved section to redirect the flow direction of fluid through the sample channel 435 so that fluid from the sample channel 435 enters the fluid droplet-generation channel 437 at an angle. In the example of FIGS. 4A through 4D, the sample channel 435 meets the fluid droplet-generation channel 437 at a 90-degree angle forming a T-junction.

The electrode openings 417, 419 on the first side surface 403 are coupled to each other by a first electrode internal volume 441. The first electrode internal volume 441 is positioned adjacent to the fluid droplet-generation channel 437 and below the sample channel 435 at the T-junction (i.e., the location where the sample channel 435 meets the fluid droplet-generation channel 437. In this example, one electrode opening 417 is larger than the other electrode opening 419 on the first side surface 403. The larger electrode opening 417 is also positioned slightly higher than the smaller electrode opening 419 on the first side surface 403 (as shown in FIG. 4A). The larger electrode opening 417 includes an angled channel that extends over the sample channel 435 to a first end of the first electrode internal volume 441. The smaller electrode opening 419 also includes a channel that extends to the opposite end of the first electrode internal volume 441. After the device 400 is formed, a first electrode can be formed by filling the first electrode internal volume 441 through one or both of the electrode openings 417, 419 with a metal material. In some implementations, wires are then extended through the electrode openings 417, 419 to contact the deposited metal material in the first electrode internal volume 441. Alternatively, in some implementations, enough metal material is deposited to fill the first electrode internal volume 441 and the channels of both electrode openings 417, 419 so that a metal contact is created at the exterior surface of the electrode openings 417, 419. In still other implementations, an assembled/formed electrode component can be inserted through one of the electrode openings 417, 419 in order to position the electrode component adjacent to the droplet-generation channel 437 in the first electrode internal volume 441.

Similarly, the electrode openings 425, 427 on the second side surface also each include a channel extending the opening to a second electrode internal volume 443. The second electrode internal volume 443 is formed adjacent to the droplet-generation channel 437 opposite the first electrode internal volume 443. A second metal electrode may be positioned in the second electrode internal volume 443 by methods similar to those described above in reference to the first electrode internal volume 441 (e.g., metal material depositing or positioning an assembled/formed electrode device into the second electrode internal volume 443 through one of the electrode openings 425, 427).

Figure 5B:
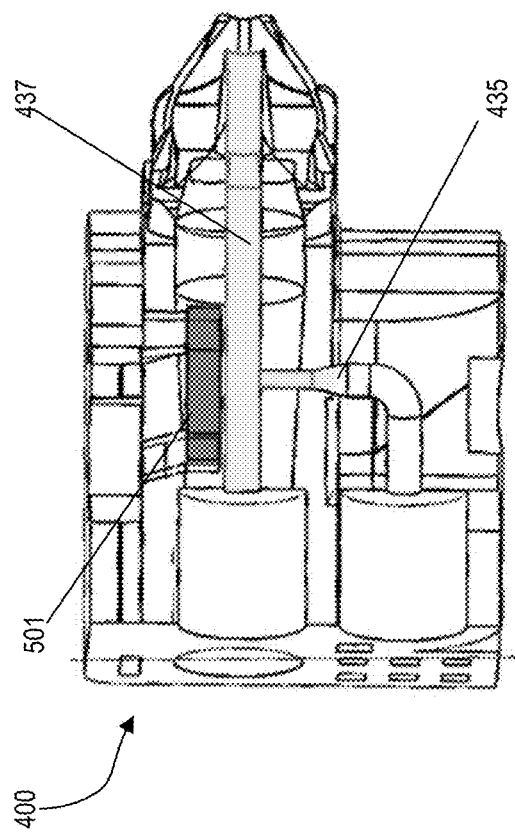
FIG. 5B is a first cross-sectional overhead view of the single piece device of FIG. 4A.
Figure 5C:
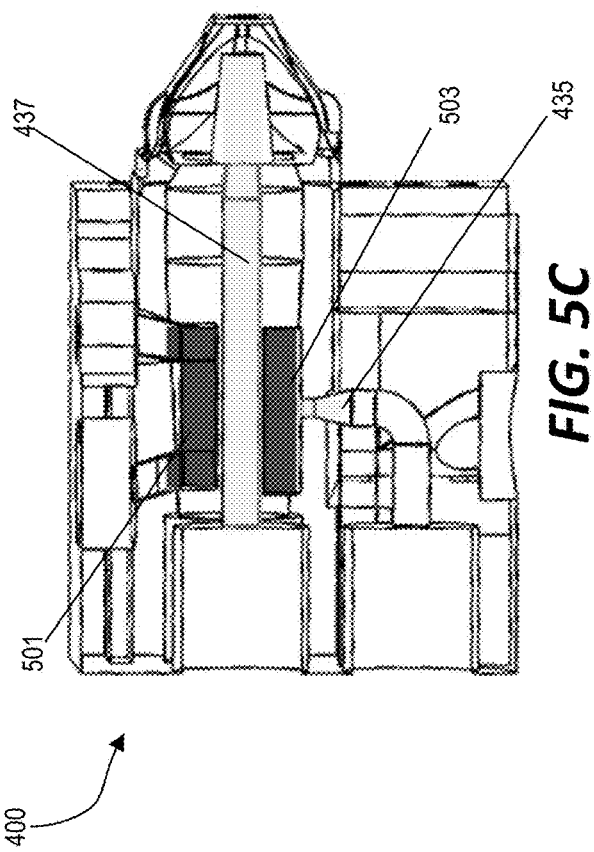
FIG. 5C is a second cross-sectional overhead view of the single piece device of FIG. 4A.
Figure 5A:
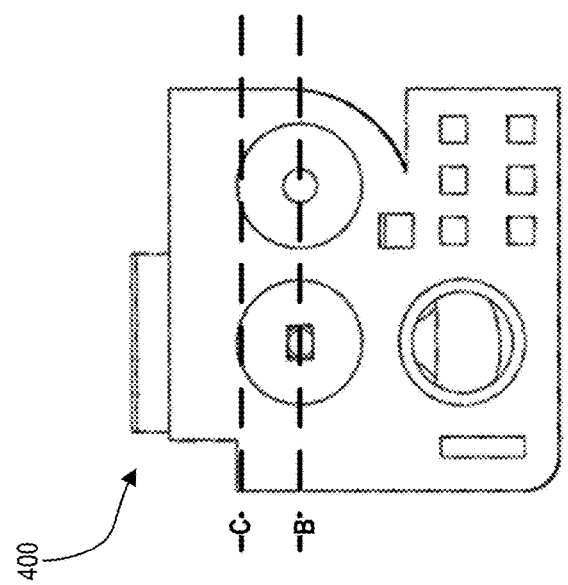
FIG. 5A is an elevation view of the rear surface of the single piece device of FIG. 4A.

FIGS. 4A through 4D illustrate one example of the device in which the first electrode internal volume is positioned at the T-junction below the sample channel 435. However, in other implementations, the internal and external structures of the device 400 may be arranged differently. For example, FIGS. 5A, 5B, and 5C illustrate another example of the device 400. The device 400 in this example includes the same components and internal channels for fluid and gas flow as in the example of FIGS. 4A through 4D. However, in this example, the first electrode 503 is positioned adjacent to the droplet-generation channel 437 above the sample channel 435. The second electrode 501 is similarly placed adjacent to the droplet-generation channel 437 opposite the first electrode 503. This placement of the first electrode 503 can be achieved, in some implementations, by a different placement of the electrode openings 417, 419 or by a different angle of the channels coupling the electrode openings 417, 419 to the first electrode internal volume 441. Alternatively, the first electrode internal volume 441 may be sized to include portions that are both above and below the sample channel 435 such that the first electrode internal volume surrounds the sample channel 435.

The device 400 is operated, in some implementations, based on the systems and methods described above in reference to FIGS. 1 through 3B. A second fluid channel 102 (i.e., an "oil" channel) is coupled to the first fluid inlet opening 411 by a capillary or tube and a first fluid channel 101 (i.e., a sample channel) is coupled to the second fluid inlet opening 413 by another capillary or tube. Similarly, a pressurized helium gas source is coupled to the gas inlet opening 415 by yet another capillary or tube. Oil pumped into the first inlet opening 411 flows into and through the droplet-generation channel 437 and droplets of the aqueous sample suspension are introduced into the droplet-generation channel 437 from the sample channel 435. The size and frequency of the droplets can be controlled by regulating operation of the fluid pumps to adjust the fluid flow rates in the first fluid channel 101 and the second fluid channel 102 as described above in reference to FIG. 2. Furthermore, the droplets are then synchronized with the pulses of the x-ray laser beam by applying a triggering signal to the fluid in the droplet-generation channel through the electrodes positioned in the first electrode internal volume 441 and the second electrode internal volume 443.

By providing the droplet generation junction, the droplet triggering electrodes, and the nozzle itself in a single piece device, the total travel distance of the droplets is reduced (in some implementations, to less than 1 cm). Single-piece devices such as device 400 of FIGS. 4A through 4D are also compatible in high-pressure systems and reduce complexity of the device & experimental setup.

Thus, the invention provides, among other things, a single-piece device for generating sample droplets in a "water-in-oil" stream, synchronizing droplet frequency with a pulse rate of a serial crystallography laser beam, and ejecting the sample as a jetted stream. Other features and advantages of the invention are set forth in the following claims.

What is claimed is:
1. A sample ejection system comprising:
a first fluid channel;
a first reservoir in fluid communication with the first fluid channel, the first reservoir configured to contain an oil;
a first pump in fluid communication with the first reservoir, the first pump configured to move the oil from the first reservoir through the first fluid channel to a nozzle, the first pump configured to regulate a rate of oil pumped from the first reservoir into the first fluid channel;
a second fluid channel intersecting the first fluid channel at a T-junction;
a second reservoir in fluid communication with the second fluid channel, the second reservoir configured to contain a volume of a crystal sample suspended in an aqueous fluid; and a second pump in fluid communication with the second reservoir, the second pump configured to move the crystal sample from the second reservoir through the second fluid channel to the nozzle, the second pump configured to regulate a rate of crystal sample pumped from the second reservoir into the second fluid channel;

wherein the crystal sample and the oil combine at the T-junction forming a combined fluid stream.

2. The sample ejection system of claim 1, wherein the combined fluid stream comprises segmented aqueous droplets in a carrier fluid that is pumped toward the nozzle.

3. The sample ejection system of claim 1, further comprising a first flow rate sensor partially positioned within the first fluid channel, the first flow rate sensor configured to sense a flow rate of the oil passing through the first fluid channel, the first pump configured to receive an output of the first flow rate sensor to regulate a rate of the oil flowing from the first reservoir.

4. The sample ejection system of claim 3, further comprising a second flow rate sensor partially positioned within the second fluid channel, the second flow rate sensor configured to sense a flow rate of the crystal sample passing through the second fluid channel, the second pump configured to receive an output of the second flow rate sensor to regulate a rate of the crystal sample flowing from the second reservoir.

5. The sample ejection system of claim 1, further comprising a shaker or cooler in communication with the second reservoir configured to maintain the crystal sample before being pumped into the second fluid channel.

6. The sample ejection system of claim 1, wherein the nozzle is a gas dynamic virtual nozzle.

7. The sample ejection system of claim 6, further comprising a pressurized gas source configured to provide a pressurized gas to the gas dynamic virtual nozzle.

8. The sample ejection system of claim 7, wherein the pressurized gas is helium.

9. The sample ejection system of claim 7, further comprising a pneumatic valve in communication with the pressurized gas source, the pneumatic valve configured to regulate a flow rate of the pressurized gas from the pressurized gas source.

10. The sample ejection system of claim 9, further comprising a pneumatic flow rate sensor configured to detect an actual pneumatic flow rate of the pressurized gas as the pressurized gas moves towards the nozzle, and wherein the pneumatic valve is controlled based on the actual pneumatic flow rate of the pressurized gas detected by the pneumatic flow rate sensor.

11. The sample ejection system of claim 8, wherein the gas dynamic virtual nozzle is configured to emit a jet of the combined fluid stream and the pressurized helium gas.

12. The sample ejection system of claim 11, wherein the combined fluid stream and the pressurized helium gas are coaxially arranged in the jet.

13. The sample ejection system of claim 12, wherein the combined fluid stream is central in the coaxially arranged jet.

14. A sample ejection system for serial crystallography, the system comprising:

a gas dynamic virtual nozzle;

a housing including
a first fluid channel in communication with the nozzle,
a first reservoir in fluid communication with the first fluid channel, the first reservoir configured to contain an oil fluid,
a first pump in fluid communication with the first reservoir,
a second fluid channel intersecting the first fluid channel at a T-junction;
a second reservoir in fluid communication with the second fluid channel, the second reservoir configured to contain a sample fluid, and
a second pump in fluid communication with the second reservoir; and an electronic controller configured to
generate an output stream by activating the first pump to move the first fluid from the first reservoir through the first fluid channel to the nozzle, and by activating the second pump to move the sample fluid from the second reservoir through the second fluid channel to the nozzle, wherein the output stream includes a series of droplets of the sample fluid in the oil fluid,
activate a laser source to generate a laser beam to interact with the output stream, and
process image data from an imaging sensor, the image data including diffraction data of the laser beam interacting with the output stream, to determine a molecular structure or other property of the sample fluid.

15. The sample ejection system of claim 14, wherein the controller is configured to adjust a first flow rate of the oil exiting the first reservoir and a second flow rate of the sample fluid exiting the second reservoir to modify one or more characteristics of the droplets.

16. The sample ejection system of claim 15, wherein the one or more characteristics include size of the droplets and frequency of the droplets.

17. The sample ejection system of claim 14, wherein the controller is configured to synchronize the activation of the laser source with an output of the output stream through the nozzle.

18. The sample ejection system of claim 14, wherein the housing and the nozzle are integrated into a monolithic device.

19. The sample ejection system of claim 18, wherein the monolithic device is fabricated by 2-photon polymerization.

20. The sample ejection system of claim 14, wherein the housing includes a plurality of electrodes positioned along the first fluid channel, and wherein the controller is configured to generate a trigger signal to the electrodes to apply an electrical signal to the oil fluid and the sample fluid.

* * * * *